(12) United States Patent
Mönch et al.

(10) Patent No.: US 7,329,009 B2
(45) Date of Patent: Feb. 12, 2008

(54) PROJECTION SYSTEM

(75) Inventors: Holger Mönch, Vaals (NL); Peter Lürkens, Aachen (DE); Carsten Deppe, Aachen (DE); Winston Donald Couwenberg, Veldhoven (NL); Johannis Antonie Toonen, Soerendonk (NL); Roy Hendrik Zundert, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 266 days.

(21) Appl. No.: 10/528,935

(22) PCT Filed: Sep. 18, 2003

(86) PCT No.: PCT/IB03/04038

§ 371 (c)(1),
(2), (4) Date: Mar. 23, 2005

(87) PCT Pub. No.: WO2004/030372

PCT Pub. Date: Apr. 8, 2004

(65) Prior Publication Data

US 2006/0023304 A1 Feb. 2, 2006

(30) Foreign Application Priority Data

Sep. 26, 2002 (DE) ................. 102 44 821

(51) Int. Cl.
*G03B 21/14* (2006.01)
(52) U.S. Cl. ........................ 353/85; 348/743
(58) Field of Classification Search .......... 353/85, 353/30, 31, 97, 88, 93, 89, 90, 84; 348/742, 348/743; 349/5, 7, 8, 9
See application file for complete search history.

(56) References Cited

U.S. PATENT DOCUMENTS

| 5,502,514 | A | 3/1996 | Vogeley et al. |
| 5,982,458 | A | 11/1999 | Kishi et al. |
| 6,297,859 | B1 | 10/2001 | George |
| 6,779,896 | B2 | 8/2004 | Luerkens et al. |
| 6,979,085 | B2 | 12/2005 | Lurkens et al. |
| 2003/0020412 | A1* | 1/2003 | Luerkens et al. ........... 315/149 |
| 2005/0077841 | A1 | 4/2005 | Luerkens et al. |

FOREIGN PATENT DOCUMENTS

| EP | 1065888 A1 | 1/2001 |
| WO | 0049813 A1 | 8/2000 |

* cited by examiner

*Primary Examiner*—William C. Dowling (57) ABSTRACT

A projection system for image reproduction includes at least one lamp and sensor for generating a sensor signal for monitoring changes in the luminous flux generated by the lamp and for compensating these changes through a suitable control of the image reproduction. The projection system further includes a device for eliminating substantially periodic interference components from the sensor signal generated by the sensor. These interference components may be generated by an optical component such as a color modulator of the projection system. The projection system provides substantially interference-free compensation of fluctuations in the luminous flux generated by the lamp, for example, owing to an unstable arc discharge. Further, the positioning of the sensor in the projection system may not be critical.

19 Claims, 6 Drawing Sheets

PROJECTION SYSTEM

The invention relates to a projection system for image reproduction by means of at least one lamp as well as a sensor for generating a sensor signal for monitoring changes in the luminous flux generated by said at least one lamp and for compensating these changes through a suitable control of the image reproduction.

The light source used in a projection system is usually formed by one or several high-pressure gas discharge lamps (HID [high intensity discharge] lamps or UHP [ultra high performance] lamps). These lamps may be operated in principle both with direct current and with alternating current. Both modes of operation have their advantages and disadvantages. AC operation can prevent a quick erosion of the electrodes and can increase the luminous efficacy of the lamp, but the arc discharge is often unstable owing to the polarity change, so that periodic brightness fluctuations or other image interferences can arise. Neither can it be excluded in a DC-operated lamp, however, that instabilities will occur in the arc discharge, in particular as the duration of operation increases, for example owing to an irregular electrode distance that has arisen in the mean time, which may manifest itself in particular in the form of arc jumping.

To safeguard an optimum, disturbance-free image quality throughout the operational life of a discharge lamp, therefore, sensors are preferably provided in both modes of operation for monitoring the generated luminous flux and for providing a suitable compensation of short-term fluctuations.

Fluctuations in the generated luminous flux may appear to be particularly disturbing in the case of color projection displays which operate with color reproduction processes in a time sequence, if one of the primary colors is reproduced with a different brightness with respect to the other primary colors, or if the brightness thereof in certain image regions differs from the brightness in other image regions.

Two time-sequence color reproduction methods are distinguished and applied nowadays.

In a first method, the color picture is generated by a sequential reproduction of full pictures in the three primary colors (<<field sequential color>>) and possibly a fourth, white picture on the display. This method is used, for example, in most DLP (digital light processing) projectors nowadays.

In a second method, the color picture is generated in that all primary colors run one after the other across the display in the form of color lines or color strips ("scrolling color"). This method is used, for example, by LCOS (liquid crystal on silicon) displays (cf. Shimizu: <<Scrolling Color LCOS for HDTV Rear Projection>>, in SID 01 Digest of Technical Papers, vol. XXXII, pp. 1072 to 1075, 2001), and SCR-DMD (sequential color recapture—digital micro mirror) projection displays (cf. Dewald, Penn, Davis: <<Sequential Color Recapture and Dynamic Filtering: A Method of Scrolling Color>> in SID 01 Digest of Technical Papers, vol. XXXII, pp. 1076-1079, 2001).

These systems comprise a color modulator arranged between the light source and the display for the generation of light with the three primary colors, which modulator may cause considerable brightness fluctuations in the system. This leads to the problem that the sensors mentioned above for monitoring the luminous flux generated by the lamp are not allowed to register these fluctuations. Instead, the sensors are to generate a signal which is proportional to the luminous flux incident on the display after the optical integration averaged over time in the ideal case. Since the optical integration and the color modulation are arranged close to one another and are interlinked in the projection systems mentioned above, however, it is comparatively difficult to find a suitable position for the sensors where the latter can register said luminous flux without interferences.

An electronic circuit for operating a HID or UHP lamp is known, for example, from DE 101 36 474.1 comprising a lamp driver circuit for providing a controlled lamp current for the lamp and a brightness sensor for generating a sensor signal which represents the luminous flux generated by the lamp. Furthermore, a high-pass or band-pass filter is provided, by means of which the sensor signal is filtered and is subsequently supplied to the lamp driver circuit for controlling the lamp current.

The high- or band-pass filter is to separate long-term changes in the luminous flux generated by the lamp, in particular a drop in luminous flux as lamp life progresses, from short-term fluctuations caused by arc jumps, such that only the latter fluctuations are used for an active control of the lamp power by the lamp driver circuit.

Such an active control (LOC—light output control), however, cannot operate reliably if the sensor signal is superimposed with interference components which, as was explained above, are caused, for example, by brightness fluctuations arise from a color modulator.

It is accordingly an object of the invention to provide a projection system of the kind mentioned in the opening paragraph in which impairments of the image quality caused by an inadvertent change in the luminous flux generated by the light source are at least substantially avoided, also in the presence of periodic brightness fluctuations caused by an optical component of the projection system.

In particular, the invention is to provide a projection system which comprises at least a high-pressure gas discharge lamp in which impairments of the image quality owing to fluctuations in the generated luminous flux, caused in particular by an unstable arc discharge, are at least substantially avoided also when a time-sequence color display is used.

Finally, the invention is to provide a projection system with a color display created by a time sequence method in which color artifacts caused by an inadvertent change in the luminous flux generated by the light source are at least substantially avoided, in particular where the light source used is formed by one or several high-pressure gas discharge lamps operated with an alternating current.

In one embodiment, the object is achieved by means of a projection system for image reproduction by means of at least one lamp as well as a sensor for generating a sensor signal for monitoring changes in the luminous flux generated by said at least one lamp and for compensating these changes through a suitable control of the image reproduction, with a device for eliminating substantially periodic interference components from the sensor signal generated by the at least one sensor.

The periodic interference components in the sensor signal may arise from brightness fluctuations (modulations) caused by an optical component. Such an optical component may be in particular a color modulator, in which case the interference components arise essentially from the different primary colors, i.e. the sensitivity of the sensor to the different primary colors.

Said control of the image reproduction here takes place at least such that fluctuations in the image brightness or resulting errors in the color and gray levels are no longer perceivable to the human eye. To achieve this, the sensor signal freed from the interference components may be used for controlling a lamp driver circuit and/or a gray level mask and/or some other element for influencing the image brightness (such as an electrically controllable optical filter) and/or a display.

A particular advantage of this solution is that the positioning of the sensor is no longer critical if as small as possible an influence of the brightness fluctuations caused by the optical component (in particular the color modulator) is to be obtained. The sensor may also be given a position behind the color separation. This has the particular result that the active control of the lamp current (LOC) mentioned above, by means of which the brightness of an image reproduced on the display is changed, may now also be used in time-sequence color reproduction methods (such as, for example, LCOS displays and DLP projectors) without a major additional expenditure, rendering possible an at least major suppression of the fluctuations in the luminous flux caused by arc jumps.

In particular, the possibility is now offered of using the image projector described in DE 102 20 510.8 and to implement the method of its operation, whereby a brightness fluctuation caused by arc jumps is eliminated so as to be no longer visible to the human eye, also when a color modulator is used.

A further advantage is that a (loss-free) fine tuning of the color temperature and an optimization of the displayable color space is possible in the case in which the optical component is a color modulator and a field-sequential color reproduction method is used, i.e. in that the sensor output signal is changed time-dependently in accordance with the occurrence of the relevant primary color.

Another embodiment includes a filter eliminate the interference components by filtering out the frequency components associated therewith in the sensor signal.

In a further embodiment, the sensor signal is subjected to a time-dependent amplification so as to suppress the interference components, and the interference components are eliminated through subtraction of a suitably generated synchronized average value from the sensor signal.

Various advantageous realizations may be achieved by using a micro controller so that only a small number of discrete or external electronic elements are necessary.

In one embodiment which is easier to implement and to install, no sensor and no sensor board has to be mounted in or at the light path of the projection system.

Further embodiments may be specially designed for a projection system with a color modulator, where individual sensitivities of the sensor or sensors to different primary colors are compensated for through a selective amplification or damping of the relevant sensor signals.

A lamp driver unit may be provided into which substantially all essential components for detecting light which is propagating along the light path, as well as for correcting the related sensor signal, are integrated.

Various alternatives may also be provided for controlling the brightness of the represented image with the sensor signal freed from the interference components so as to compensate for changes in the luminous flux generated by the lamp (for example caused by arc jumps).

A further embodiment involves a modification in the sense that the color temperature of a reproduced image can be set or attuned in a desired manner.

Further particulars, features, and advantages of the invention will become apparent from the ensuing description of preferred embodiments, which is given with reference to the drawing, in which.

The brightness of an image reproduced on the projection display is controlled through a change in the lamp current by means of a lamp driver circuit in the embodiments described below (FIGS. 1, 4, 5, 7, 13 and 14). Alternatively or additionally thereto, however, it is possible to change the brightness of the image by means of an electrically controllable optical filter, which is additionally inserted into the radiation path between the lamp and the display, and/or a gray level mask in the form of a factor by which the brightness of the image reproduction on the display is influenced. These two alternatives, which are particularly suitable for the very fast displays used in the DLP systems, are described in detail in DE 102 20 510.8. This publication is to be included in the present disclosure by reference, so that it need not be individually described any further below.

The invention will first be described with reference to a projection system (Scrolling Color System) with an SCR-DMD display operating by the second method mentioned above. The construction and manner of operation of such a projection system are extensively explained in the cited article <<Sequential Color Recapture and Dynamic Filtering: A Method of Scrolling Color>> by Dewald, Penn, Davis in SID 01 Digest of Technical Papers, vol. XXXII, pp. 1076 to 1079, 2001. This article is to be incorporated into the present description by reference.

Figure 1:
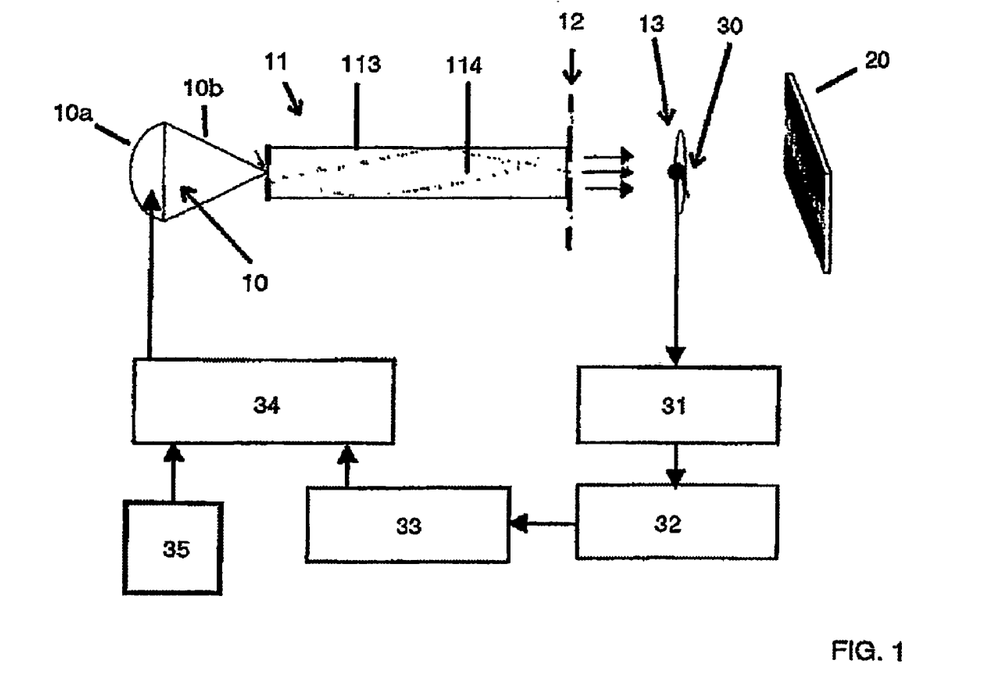
FIG. 1 shows the construction principle of a Scrolling Color/SCR color projection system in a block diagram of essential electrical components representing a first embodiment of the invention.

FIG. 1 shows the construction principle of the illumination portion of such a projection system. A light source with a lamp 10 and a reflector 10a and essential optical components are shown here, i.e. a rod integrator (light resonator) 11, a color wheel 12, a relay lens (optical projection lens) 13, and a DMD display 20, which is driven in a known manner by a driver device. The image generated on the DMD display 20 is finally projected onto a screen or similar device (not shown) by means of a lens.

The light source comprises one or several high-pressure gas discharge lamps 10 and one or several reflectors 10a by means of which a light cone 10b is directed at an inlet surface of the rod integrator 11.

The rod integrator 11 has a highly reflective jacket 113 which encloses a hollow space 114. The light coupled into the rod integrator 11 is reflected many times against the jacket 113 and is homogenized, given a sufficient length of the integrator 11, so that an essentially homogeneous distribution of the luminous intensity is obtained at the outlet surface thereof. The rod integrator 11 may alternatively be formed by a solid optical waveguide of an optical material, in particular glass.

The color wheel 12 (color modulator) comprises red, green, blue, and transparent dichroically reflecting coatings which are arranged in the form of an RGB pattern of Archimedean curves. The pattern is dimensioned such that one or several colored spirals cover the cross-section of the outlet surface of the integrator at any time. The pattern has the property that the boundaries between the colors red, green, and blue move with constant speed in radial direction when the color wheel 12 is rotated. As a result, the RGB pattern moves with a substantially constant speed across the outlet surface of the rod integrator. The distance between the outlet surface of the rod integrator 11 and the color wheel 12 should be as small as possible so as to avoid light losses.

The relay lens 13, finally, projects the RGB pattern (color strips) onto the DMD display 20. When the color wheel 12 rotates, this RGB pattern moves continuously over the DMD display 20.

In FIG. 1, furthermore, a light sensor 30 is arranged adjacent the relay lens 13. Alternative locations where the sensor 30 can be positioned without space problems also suggest themselves, however, because the region between the color wheel 12 and the display 20 is generally convoluted. Typically, the sensor 30 is positioned such that it scans the central region of the image. Alternatively, the sensor could also be arranged, for example, laterally displaced with respect to the relay lens 13 so as to catch scattered light such as in particular the light reflected back from the lens 13.

Figure 2:
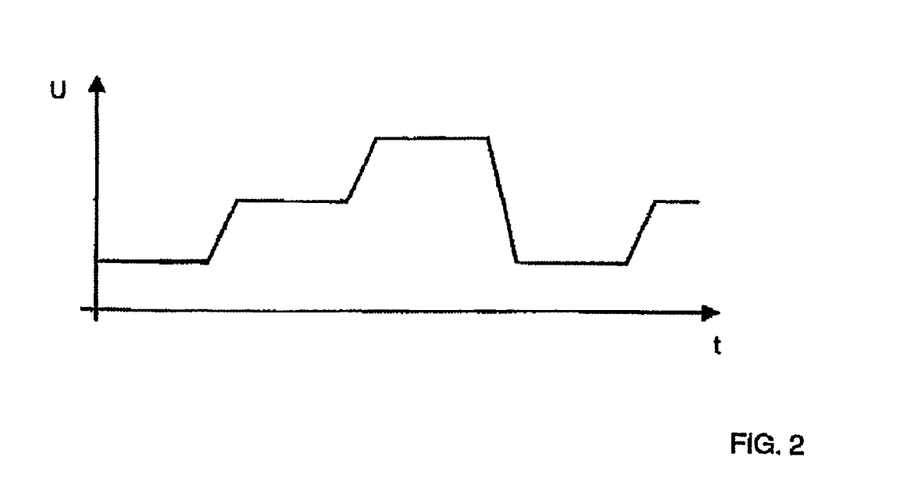
FIG. 2 shows a sensor signal gradient.

FIG. 2 diagrammatically shows the cyclical stepped gradient in time of a sensor signal generated by the sensor 30 in the position shown, provided the sensor 30 is sufficiently small and is accordingly illuminated by only one color strip at a time, except for a transition which is as short as possible between two adjoining color strips (leading to a transition of corresponding steepness between the steps of the sensor signal). The three distinct amplitudes result from the different brightnesses of the three color strips or the different sensitivities of the sensor to the three primary colors.

A similar sensor signal stepped in accordance with the color sensitivity of the sensor also results from the first method mentioned above, in which the color image is generated by full images in the three primary colors in a time sequence, in which case an additional white image will lead to a corresponding fourth step.

If a fluctuation in the luminous flux generated by the light source, for example caused by an unstable arc discharge, the control of a lamp driver circuit, and/or by an electrically controllable optical filter, and/or by a gray level mask of the display, is to be compensated with this sensor signal, it is necessary to eliminate the modulation of the sensor signal caused by the color strips (or the primary color images). Two aspects of this modulation are of particular importance in the case of color strips (a corresponding argument holding for the modulation caused by the primary color images):

1.) the frequency of the modulation determined by the speed of rotation of the color wheel 12 lies well above the limit frequency of the human eye because of the requirement that the color strips (or the primary color images) must not be visible on the display 20;

2.) the frequency of the modulation is in addition very accurately laid down and constant so as to safeguard a correct image build-up. It is dependent on the synchronization of the color wheel, while further modulation frequencies may arise in the case of a plurality of color traversals in one revolution of the color wheel.

The elimination of this modulation takes place by means of the circuit components explained below.

In the first embodiment of the invention shown in FIG. 1, said circuit components comprise an amplifier 31 to whose input the signal of the sensor 30 is applied, a comb filter 32 to which the sensor signal amplified by the amplifier 31 is fed, a HES (human eye sensitivity) filter 33 connected to the output of the comb filter 32, and a controllable lamp driver circuit 34 to which a power supply 35 and the output signal of the HES filter 33 are applied and which supplies a controlled lamp current for the lamp or lamps 10 connected to its output.

Figure 3:
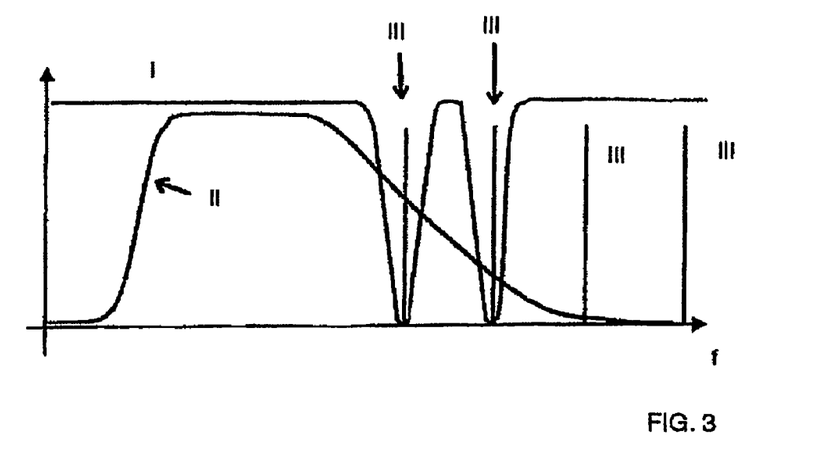
FIG. 3 diagrammatically depicts various filter functions.

The transmission characteristic of the comb filter 32 (I) and of the HES filter 33 (II) are shown in FIG. 3. This diagram in addition contains some of the frequency components (III) of the sensor signal caused by the modulation described above. These are the basic frequency of the color strips and the harmonics thereof.

The non-transmitting frequency ranges of the comb filter 32 are located such that at least the lower frequency components of the modulation lie in these regions, so that thereby interferences in the sensor signal caused by the color wheel 12 are eliminated at least to the extent that a fluctuation in the generated luminous flux caused by an unstable arc discharge or other effects is compensated by the sensor signal and accordingly an image disturbance can be avoided.

A further criterion in the dimensioning of the comb filter 32 is that the signal components important for the HES filter 33 are to be influenced as little as possible. For this purpose, the edges of the comb filter delimiting the non-transmitting frequency ranges are made as steep as possible.

Figure 4:
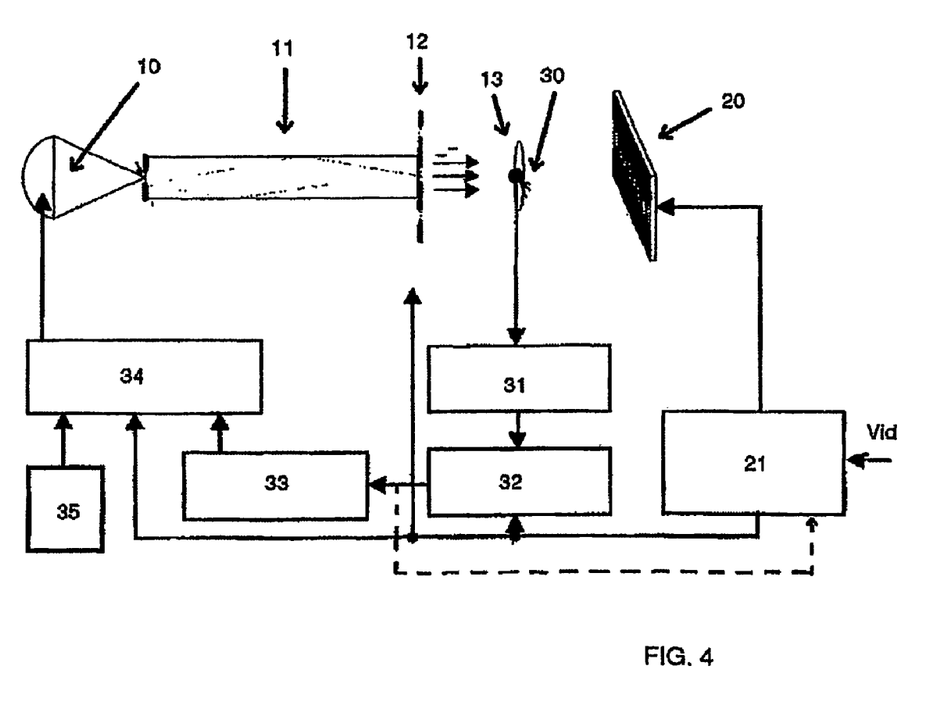
FIG. 4 shows the construction principle of a Scrolling Color/SCR color projection system with a block diagram of essential electrical components representing a second embodiment of the invention.

An embodiment of the invention which is particularly advantageous in this respect is shown in FIG. 4. Similar or corresponding components have been given the same reference numerals as in FIG. 1, so that it suffices essentially to discuss the differences only.

The signal generated by the light sensor 30 is amplified by an amplifier 31 again in this case, filtered by a comb filter 32 and a HES filter 33, and supplied to a lamp driver circuit 34 for driving the at least one lamp 10.

Furthermore, an image processing and control unit 21 with an image processor is shown, to which a video signal Vid to be displayed is applied and which serves to drive the display 20. An image synchronicity signal is derived from the unit 21, which signal serves to control the lamp 10 via the lamp driver circuit 24 and to control the color wheel 12. The image synchronicity signal is also supplied to the comb filter 32 and controls the filter characteristic in accordance with the color strips traveling over the sensor 30.

For this purpose, the comb filter is constructed by a technology in which the filter frequencies can be proportionally influenced by a clock signal. Such filters are, for example, switched capacitor filters or all kinds of digital filters. The clock frequency with which the comb filter is operated is now set to a fixed ratio by means of the image synchronicity signal (usually a multiple of the synchronization frequency; the adjustment takes place, for example, with a phase-locked loop). It is achieved thereby that the filter frequencies are always exactly attuned to the color frequency.

The high degree of synchronicity renders it possible to realize very steep filter edges in a comparatively simple manner because the same synchronicity signal is thus used both for controlling the color wheel 12 (and thus the color strips running across the sensor and causing the interferences) and for controlling the filter characteristic of the comb filter 32 suppressing these interferences. No tolerance problems occur, furthermore, and no equalization is necessary.

The output signal of the comb filter 32 may optionally be fed back to the image processing and control unit 21 (broken line), so that the display 20 can be driven thereby alternatively or additionally to the lamp driver circuit 34, so as to control the image brightness correspondingly in this manner. This alternative may be particularly advantageously used for a fast elimination of residual fluctuations, and in this respect especially for the fast displays used in DLP systems as disclosed in the cited DE 102 20 510.8.

Figure 5:
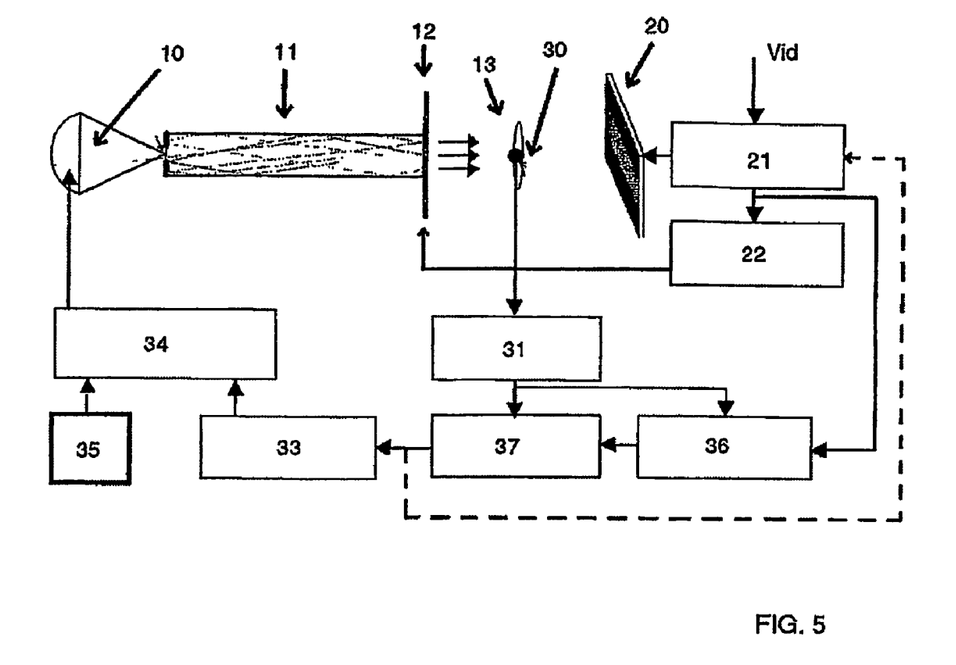
FIG. 5 shows the construction principle of a Scrolling Color/SCR color projection system with a block diagram of essential electrical components representing a third embodiment of the invention.

FIG. 5 shows a third embodiment of the invention. Identical or similar components have again been given the same reference numerals here as in FIGS. 1 and 4, so that it suffices in principle to discuss the differences only.

The signal generated by the light sensor 30 is amplified by an amplifier 31 and subsequently fed to a unit 36 for generating a sliding average and to a subtractor 37 connected thereto. The output of the subtractor 37 is connected to a HES filter 33 whose output signal is fed to a lamp driver circuit 34. The lamp driver circuit 34 generates a lamp current for operating the at least one lamp 10 from a power supply 35.

FIG. 5 further shows an image processing and control unit 21 to which a video signal Vid to be displayed is supplied and which serves to drive the display 20. An image synchronicity signal is derived from the unit 21 again, which signal serves to control the color wheel 12 by means of a motor control 22.

In this third embodiment, the interferences in the sensor signal caused by the color wheel 12 are eliminated through subtraction of exactly these interferences from the sensor signal by means of the subtractor 37. The portion to be subtracted is generated by the unit 36 in that the portion of the sensor signal synchronous with the color wheel is exactly determined through an average value determination synchronized with the color frequency.

The unit 36 for generating the sliding average preferably comprises a microcontroller with a control unit, a memory, an A/D converter, and a D/A converter. The program implemented in the control unit then realizes, for example, the following functions and procedures:

First, a counter N is reset to 0 by means of a synchronicity signal, and a main loop is started.

Optionally, it is tested upon reception of a synchronicity signal whether the frequency of the color wheel has changed through a comparison of the distances of preceding synchronicity signals. If this is the case, the average value is reset.

The main loop comprises the following steps:
providing a sample value $X_N$ via the D/A converter to the output of the unit 36 for subtraction from the sensor signal,
measuring a new sample value $Y_N$ at the A/D converter, forming the sliding average through weighted addition in accordance with the following equation: $X_N=X_N*Z+Y_N*(1-Z)$, with Z being the weighting factor (for example, Z=0.999),
raising the value of N: N=N+1,
waiting until the next scanning moment.

Mathematically, this formation of an average value constitutes a very long chain of signal delay members (allpass) with slowly decreasing weight factors. The delay time is determined by the maximum value of N (before the next synchronicity signal) and the scanning time. A substantially ideal comb filter is created thereby in conjunction with the subtractor.

The subtractor 37 in its simplest form can be realized with an operational amplifier.

The third embodiment thus essentially forms a modification of the second embodiment in which sliding averages are generated by the digital filter described (filtering in the time range) instead of the comb filtering in the frequency range, which averages are subtracted from the sensor signal.

The output signal of the subtractor 37 may optionally be fed back to the image processing and control unit 21 (broken line), so that the display 20 can be driven thereby alternatively or additionally to the lamp driver circuit 34, as in the second embodiment shown in FIG. 4, so as to control the image brightness correspondingly in this manner. This alternative is again particularly suitable for a fast control of residual fluctuations in combination with the fast displays used in DLP systems as disclosed in the cited DE 102 20 510.8.

Figure 6:
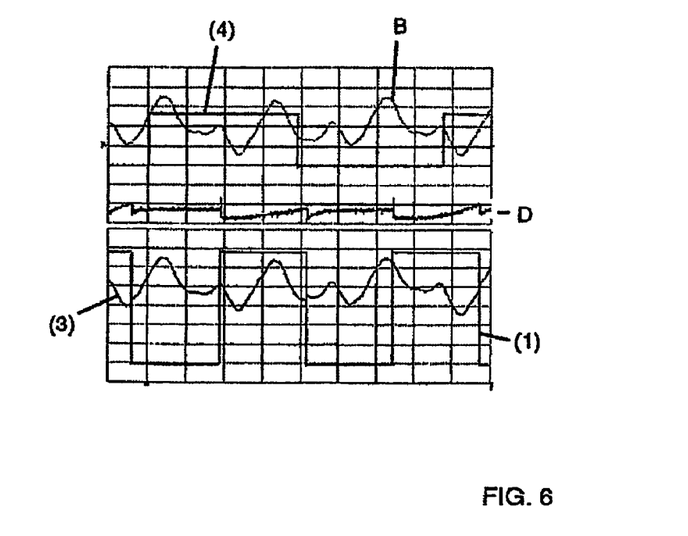
FIG. 6 shows various voltage gradients in the system shown in FIG. 5.

FIG. 6 shows measured voltage gradients in time of various circuit components of the third embodiment of FIG. 5. Curve (3) represents the sensor signal affected by the modulation (interference), which is applied to the unit 36 and the subtractor 37 after the amplification. The unit 36 further receives a synchronicity signal in accordance with curve (4) derived, for example, from the motor control 22. Curve (B) represents the calculated average value at the output of the unit 36. Subtraction in the subtractor 37 results at the output thereof in the signal (D) which represents the typical gradient of the luminous flux of the lamp. This gradient no longer comprises any components correlating with the color wheel 12, but only the light fluctuations arising from the lamp current. Curve (1), finally, is the lamp current at the output of the lamp driver circuit 34.

An alternative possibility is to have the process that is carried out by the subtractor 37 and/or the HES filter 33 take place in the microcontroller of the unit 36. It is furthermore possible to realize the amplifier 31, the unit 36, the subtractor 37, and the HES filter 33 as a functional unit in the lamp driver circuit 34.

Figure 7:
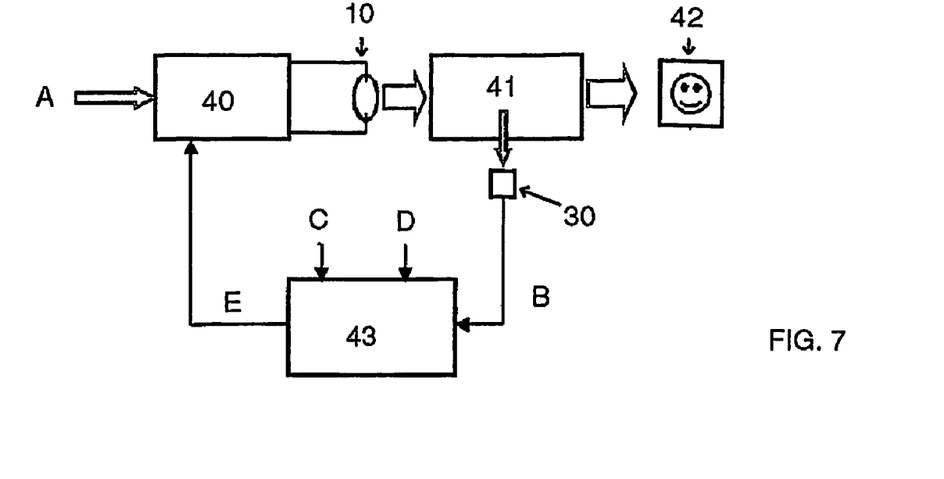
FIG. 7 shows the construction principle of a color projection system including a block diagram of the essential electric components, representing a fourth embodiment of the invention.

FIG. 7 shows a schematic block diagram of a fourth embodiment of the invention in which several functional units as for example those shown in FIG. 5 are integrated with each other.

In correspondence with FIG. 5, a lamp driver unit 40 with an active control of the lamp output (LOC) is provided which is connected with a power supply A. A (UHP) lamp 10 is connected with the output of this unit 40. The light generated by the lamp 10 is directed onto a light engine 41 which in correspondence with the depiction in FIG. 5 substantially comprises a light integrator 11, a color modulator 12, a relay optic 13 and a DMD display 20. By means of this light engine 41 a picture is projected onto a screen 42. The light engine 41 further comprises a light sensor 30 for detecting light which is propagating within the light engine 41.

The output signal of the sensor 30 is fed to a first input B of a sensor signal processing unit 43 (LOC sensor board) which in correspondence with FIG. 5 can comprise for example an amplifier 31, a subtractor 37, a unit 36 for generating a sliding average of the sensor signal and optionally a HES-filter 33.

A synchronicity signal which is derived from the color modulator 12 is fed to a second input C of the sensor signal processing unit 43, whereas a supply voltage is connected to a third input D. An output E of the unit 43 is connected to the lamp driver unit 40. By means of this sensor signal processing unit 43 the output signal of the sensor 30 which is superimposed by said interference components is processed according to the above explanations so that it is freed from the interference components and may be used for controlling the lamp driver unit 40.

As described in connection with the third embodiment shown in FIG. 5 the interference components are substantially generated by variations of the brightness caused by a color wheel (or color modulator) 12, so that they are synchronised with the rotation of such a color wheel.

If as mentioned above, the detected sensor output signal is slidingly averaged by means of a synchronicity signal which is derived from the rotation of the color wheel and which is fed to the second input C of the unit 43, these interference components can be eliminated by subtracting the sliding average value of the sensor signal from the interferenced sensor signal. The sensor signal which results by this, is now at least substantially proportional to the light impinging onto the screen 42 and can be used for controlling the lamp driver unit 40 and consequently for holding constant the luminous flux generated by the lamp 10.

By means of the integration according to FIG. 7, of the components which are shown in FIG. 5, a modularity is achieved by which the generation and use of a disturbance and interference free sensor signal according to the invention is at least substantially independent from the kind of the projection system and which can be applied advantageously for SCR systems.

In the following, three alternatives shall be described exemplarily with reference to FIGS. 8, 9 and 10, respectively, by which the fourth embodiment shown in FIG. 7 and especially the sensor signal processing unit 43 can be realized.

Figure 8:
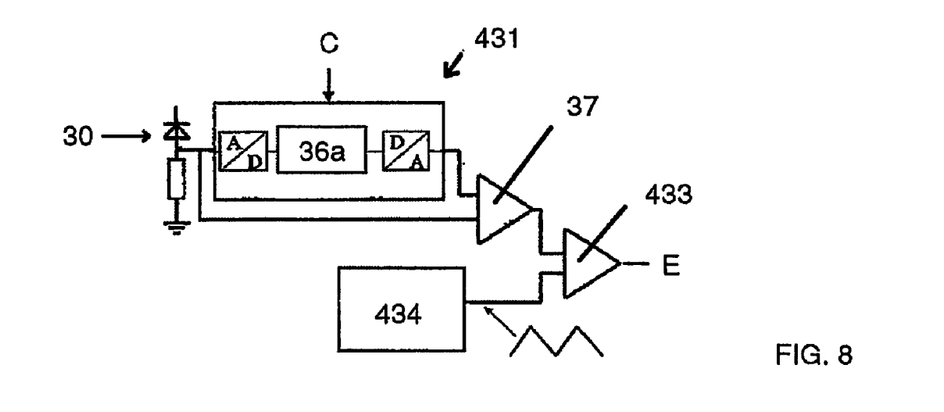
FIG. 8 shows a schematic block diagram of a first realization of the fourth embodiment shown in FIG. 7.

FIG. 8 shows a schematic block diagram of a first realization of the fourth embodiment in a substantially analog implementation. The circuit comprises a micro controller 431 with a digital signal processing (DSP) which comprises a series connection of an analog/digital converter A/D, a digital unit 36a for generating said average value of the sensor signal and a digital/analog converter (D/A).

A first input of the micro controller 431 is connected with the sensor 30, and a synchronicity signal which is derived from the rotation of the color wheel is fed to the second input C.

The circuit further comprises a subtractor (differential amplifier) 37 whose first input is connected with the output of the micro controller 431 and whose second input is connected with the sensor 30. The output of the subtractor 37 is connected with a first input of a comparator 433 whose second input is provided with the signal of a wave form generator 434.

By means of this circuit the output signal of the sensor 30 is first digitized within the micro controller 431. By means of the synchronicity signal (trigger signal) fed to the second input C the digitized sensor signal is then slidingly averaged in synchronicity with the time period of the rotation of the color wheel as explained above. The averaged digital signal is converted into analog form and fed to the first input of the subtractor 37.

By means of the subtractor 37 the difference between the sensor signal which is directly supplied from the sensor 30 (and which is disturbed by the interference components) and the averaged sensor signal is generated. According to the above explanations in connection with the third embodiment shown in FIG. 5, this differential signal is proportional to the luminous flux generated by the lamp (lamp light information) and is supplied to the lamp driver unit 40 for controlling the lamp current. For simplifying the transmission to the unit 40 the output signal of the subtractor 37 is converted in a known manner by means of the comparator 433 and the wave form generator 434 into a pulse width modulated signal (PWM) which can be converted into an optical signal and sent over an optical fiber. However, other modulations and transmission methods may be applied as well.

Figure 9:
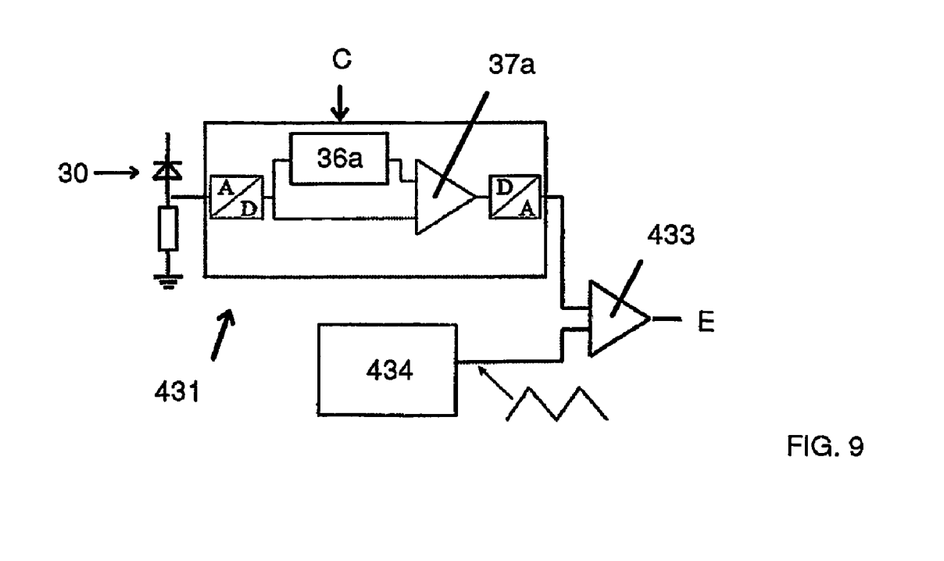
FIG. 9 shows a schematic block diagram of a second realization of the fourth embodiment shown in FIG. 7.

FIG. 9 shows a second realization of the fourth embodiment which is substantially a digital implementation. Similar or corresponding components as in FIG. 8 have been given the same reference numbers as in FIG. 8 so that reference is made to the related explanations in connection with FIG. 8.

The main difference in comparison to the circuit shown in FIG. 8 is that the subtractor 37a is implemented in digital form and integrated into the micro controller 431 so that the differential signal is calculated in a digital way. Accordingly the slidingly averaged sensor signal is fed from the output of the unit 36a to a first input of the digital subtractor 37a and the digitized sensor signal which however is disturbed by the interference components, is fed from the output of the analog/digital converter A/D to the second input of the digital subtractor 37a.

The output of the subtractor 37a is connected with the digital/analog converter D/A so that the differential signal is converted into analog form and is available at the output of the micro controller 431 for transmission to the lamp driver unit 40 again in the form of a pulse width modulated signal (PWM) according to the explanations above.

Figure 10:
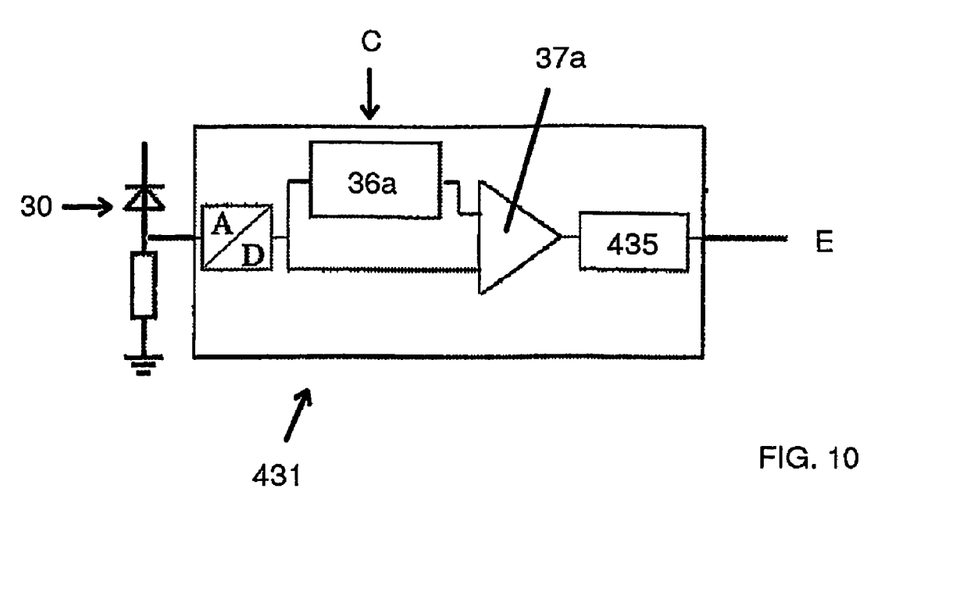
FIG. 10 shows a schematic block diagram of a third realization of the fourth embodiment shown in FIG. 7.

FIG. 10 shows a third realization of the fourth embodiment which is a totally digital implementation. Similar or corresponding components as in FIG. 9 have been given the same reference numbers as in FIG. 9 so that reference is made to the related explanations in connection with FIG. 9.

The main difference in comparison to the circuit according to FIG. 9 is that the entire sensor signal processing unit 43 is realized within the micro controller 431 so that substantially no other components are necessary for generating the control signal for the lamp driver unit 40 from the sensor output signal.

Furthermore the micro controller 431 comprises no digital/analog converter D/A. The differential signal which is available at the output of the digital subtractor 37a, is converted into an output signal by means of a transmitting unit 435, preferably a pulse width modulator (PWM). The output signal is preferably transmitted as an optical signal via an optical fiber to the lamp driver unit 40 so that no further processing is necessary.

Another advantage of this implementation is the fact that it is applicable in a very flexible way in substantially any projection system and especially in those systems in which no sensor position can be found in which a sensor signal can be generated which is suitable for controlling the lamp driver and which contains no disturbance or interference components. Furthermore other functions can be supplemented in an easy way like for example an automatic gain control or an optimal sensor biasing.

For sake of completeness it is noticed that the micro controller 431 must have sufficient memory to store the averaged sensor signal, a fast enough analog/digital converter A/D and a PWM generator with a sufficient high resolution at a high operating frequency.

Figure 11:
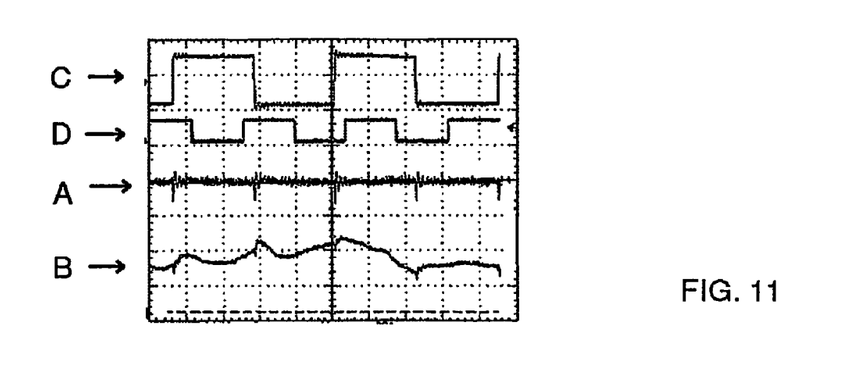
FIG. 11 shows several signal gradients using the fourth embodiment.

FIG. 11 shows a diagram of various signal gradients which reveal upon application of the circuit shown in FIG. 7 and especially in one of the FIGS. 8 to 10. Curve A shows the corrected sensor signal which is free of periodic interference components and which is the typical course of the luminous flux generated by the lamp. This signal is available at the output E of the unit 43 or the micro controller 431 and is fed to the lamp driver unit 40.

Curve B shows the course of the lamp power which is controlled by the lamp driver unit 40 to achieve the constant luminous flux according to curve A.

Curve C shows the course of the lamp current at the output of the lamp driver unit 40 whereas curve D shows the synchronicity signal which is supplied to the unit 43 or the micro controller 431 and which is derived for example from the rotation of the color wheel.

Figure 12:
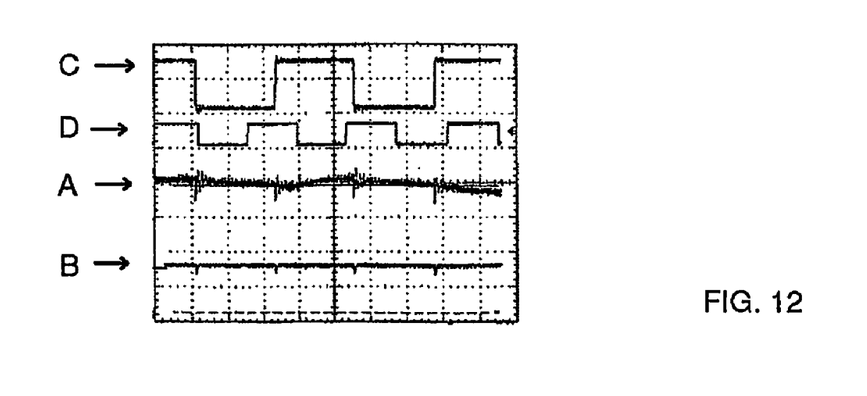
FIG. 12 shows several signal gradients without using the fourth embodiment.

In comparison to this, FIG. 12 shows the courses of these curves A to D in a case in which the unit 43 or the micro controller 431 is not active but the sensor signal is supplied to the lamp driver unit 40 without any correction. As especially obvious from curve A, the sensor signal contains periodic interference components so that the luminous flux which is generated by the lamp 10 comprises these interference components as well.

A modification of the fourth embodiment shown in FIG. 7 can be made in such a manner that the synchronicity signal which is fed to the sensor signal processing unit 43 and which is used for averaging the sensor signal, is generated by the sensor signal processing unit 43 itself rather than being supplied to it from the color modulator.

For achieving this, the sensor signal which is fed to the unit 43 or to the micro controller 431 can be analyzed with respect to periodically repeating wave forms. When such periodic wave forms are detected, a synchronicity signal which correlates with these wave forms is generated by the unit 43 or the micro controller 431 by digital signal processing so that no extra circuits or optical or electrical connections are necessary for generating and supplying an external synchronicity signal from the color modulator to the unit 43.

This modification is very advantageous and opens the possibility to integrate the sensor signal processing unit 43 into the lamp driver unit 40 because the only external connection which is needed is the one for the sensor.

In this case the sensor 30 is preferably integrated into the lamp driver unit 40 as well. For detecting the light propagating within the light engine 41, an optical fiber is provided which is coupled with one end to the sensor 30. The other end of the fiber is provided with an incoupling part for example in the form of a lens element and is arranged within the light path of the light engine 41.

This modification offers a very high degree of flexibility because when installing the projection system only an appropriate position for the incoupling end of the optical fiber has to be found for arranging the same in such a way that the light which is propagating within the light engine 41 can be detected. Consequently, it is no longer necessary to mount a large sensor circuit board comprising the sensor 30 and the necessary transmitting circuits within or at the light engine 41. By this, the related components for providing a power supply are superfluous as well.

A further advantage is that no problems with mains isolation may occur. Usually such problems have to be avoided by using a puls width modulator and an electro-optic coupler at the sensor side and an opto-electric coupler and a puls width demodulator at the side of the sensor signal processing unit 43 so that these components are superfluous as well.

Because the whole system in this way contains less electrical components it is much less sensitive against electrical tolerances of these components as well.

Figure 13:
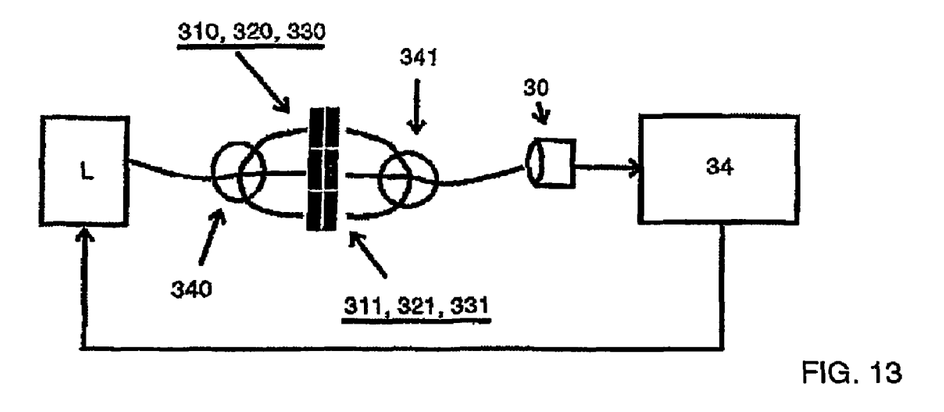
FIG. 13 partially depicts a fifth embodiment of the invention.
Figure 14:
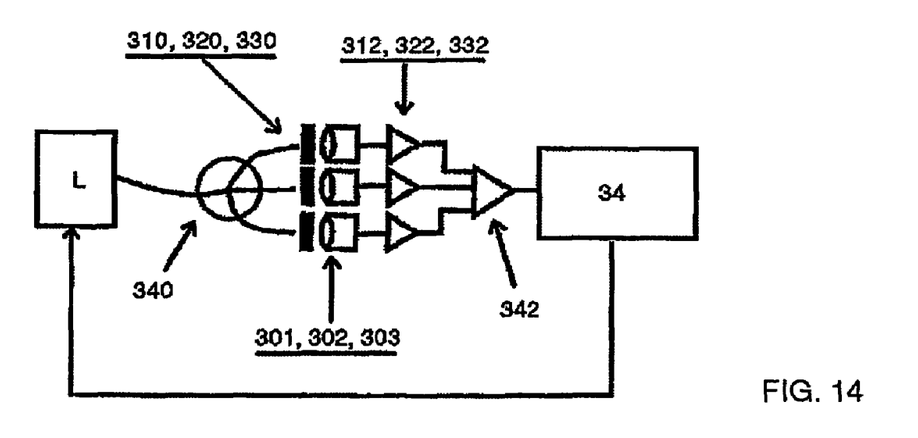
FIG. 14 partially depicts a sixth embodiment of the invention.

FIGS. 13 and 14 show a fifth and a sixth embodiment, respectively, of the invention. In these Figures, the illumination portion of a projection system is shown as one block denoted L. This illumination portion L comprises essentially a light source with a lamp, a reflector, a rod integrator, a color modulator, a relay lens (optical projection unit), and a display, in accordance with FIGS. 1, 4, and 5. Furthermore, these Figures show a controllable lamp driver circuit 34 to which are applied the output signals of a sensor 30 or sensors 301, 302, 303 and which serves as a power supply for the lamp 10 as in the embodiments shown in FIGS. 1, 4, and 5.

In the fifth embodiment (FIG. 13), the interference portions (modulations) of the sensor signal caused by the color modulator are eliminated in that the sensor supplies an at least substantially equal signal for the three primary colors. As a result, each of the colors sequentially generated by the color modulator leads to a sensor signal with substantially the same level each time. The sensor signal is accordingly constant if the luminous flux of the lamp 10 is constant and will change only in dependence on a change in this luminous flux.

To achieve this, a small portion of the light is branched off in a location of the illumination portion L that may be chosen at will between the lamp and the projection display and is supplied to a first beam splitter 340.

Three light channels, for example in the form of glass fibers, are connected to the output of the first beam splitter 340 so as to direct the light to a filter arrangement comprising a first color filter 310, a second color filter 320, and a third color filter 330. These color filters each transmit only one of the three primary colors. Downstream of the color filters there are color-neutral transmission filters 311, 321, 331, respectively, whose transmittance is determined in dependence on the sensitivity of the sensor in the spectral range of the primary color of the respective light channel, as will be explained further below, such that different sensitivities of the sensor to the three primary colors are compensated for by suitable dampings by means of the transmission filters 311, 321, 331.

The light portions guided in the three channels are then combined again in a second beam splitter 341 and directed at the sensor 30. The lamp driver circuit 34 is subsequently controlled by the output signal of the sensor 30, as was noted above, such that brightness fluctuations in the luminous flux generated by the lamp are prevented.

This operating principle is based on the consideration that the electrical response signal of the sensor r for all three primary colors R, G, B is made the same in accordance with the following first equation: $r(R)=r(G)=r(B)$.

The following, second equation holds for the electrical response signal of a sensor: $r(\lambda)=cI(\lambda)T(\lambda)S(\lambda)F(\lambda)$, in which c is a constant, $I(\lambda)$ the power spectrum of the lamp light, $T(\lambda)$ the transmittance of the optical system and the filter system, S(λ) the spectral sensitivity of the sensor, and F(λ) the transmittance of an additional filter in front of the sensor.

Finally, the following, third equation holds for the average light quantity of each color between the wavelengths λ1 and λ2, representing the boundaries of the primary colors defined by the system: $I(c_{RGB}) = \int d\lambda I(\lambda)$.

These three equations may be used for calculating the transmittance values F(λ) of the transmission filters 311, 321, 331 to which each of the primary colors is subjected so as to obtain a sensitivity of the sensor 30 which is the same for all primary colors.

Instead of three individual color filters 310, 320, 330 and three individual transmission filters 311, 321, 331, a single filter (not shown) with three transmission regions in the primary colors may alternatively be used. In that case, the transmittance is determined in accordance with the above equations for each spectral primary color range again such that different sensitivities of the sensor 30 to the three primary colors are compensated for by suitable damping. In this case, the two beam splitters 340, 341 are not necessary either.

FIG. 14 shows the sixth embodiment of the invention, in which the same components as in FIG. 13 have been given the same reference numerals.

Here, again, a light portion branched off from the illumination portion L is applied to a first beam splitter 340, split up into three light channels, and aimed at a first color filter 310, a second color filter 320, and a third color filter 330. These filters are again each transmissive to only one of the three primary colors. In contrast to the fifth embodiment of FIG. 13, a sensor 301, 302, 303 is arranged behind each color filter 310, 320, 330. The sensor signals are amplified by respective amplifiers 312, 322, 332. The amplification factors of the amplifiers are determined in the same manner as the transmittance values of the transmission filters 311, 321, 331 as explained above such that different sensitivities of the sensors to the three primary colors are mutually equalized, with the result that the sensors have at least substantially the same sensitivity to the primary colors.

The output signals of the amplifiers 312, 322, 332, finally, are combined in a mixer and subsequently supplied to the lamp driver circuit 34 for controlling the lamp current in the manner described above.

A particular advantage of this sixth embodiment is that it can also be used in those SCR systems in which the color modulator (color wheel) comprises a white (transparent) segment. This serves in general to increase the brightness on the picture screen.

It should be heeded here that such a white segment in the time interval of its occurrence will lead to an increased sensor signal to the lamp driver circuit 34 in comparison with the primary colors and accordingly to an interference portion which is to be eliminated for obtaining a detection of the luminous flux generated by the lamp without interference.

For this purpose, the property may be utilized that the white (transparent) segment leads to an increased output signal for all three sensors 301, 302, 303 of FIG. 14, in contrast to the primary colors. This can be detected by the mixer 342 and compensated for through a suitable control in that in this time interval, for example, only one sensor output signal is passed on, or the mixer output signal is limited to the level of a sensor output signal, or all sensor output signals are blocked.

The elimination of the interferences in the sensor signal caused by the color bars (scrolling color method) according to the invention described with reference to FIGS. 1, 4, 5, 13, and 14 can also be used when images with the three primary colors and possibly a white image are represented one after the other (field sequential color method) on the display. This method is often used, for example, in DLP projectors.

In the case of the first and second embodiment of FIGS. 1 and 4, the frequencies of the comb filter or the image synchronicity signal serving for its adjustment are to be attuned to the repetition frequency of the primary color images. In the third embodiment of FIG. 5, the average value formation is to be synchronized with this repetition frequency. Apart from that, the explanations relating to the first to third embodiments are valid also here.

Furthermore, if the sensor signal has a stepped gradient, for example as shown in FIG. 2, the second or third embodiment shown in FIG. 4 or 5 may be modified such that the image synchronicity signal mentioned there and generated by the image processing and control unit 21 is used for changing the amplification factor of the amplifier 31 in dependence on the primary color instantaneously incident on the sensor, i.e. the color strip, such that a sensor signal of the same level arises for all colors in the case of an equal luminous flux generated by the lamp, with the result that the steps shown in FIG. 2 lie at the same level. The comb filter 32 or the unit 36 for generating the sliding average and the subtractor 37 may then be omitted.

The relative positions of the steps of the sensor signal shown in FIG. 2 can be calculated beforehand from the lamp spectrum, the color filter functions, and the sensor sensitivity, so that also the amplification factors necessary for their compensation can be calculated.

The calculation of the amplification factors for the individual primary colors here takes place in the same manner as described above for the calculation of the transmittance values of the transmission filters 311, 321, 331 with reference to the fifth embodiment of FIG. 13 and the calculation of the amplification factors of the amplifiers 312, 322, 332 with reference to the sixth embodiment of FIG. 14. The gradients of the amplification factors would thus run inversely to the gradients of the non-corrected sensor signal (for example, as shown in FIG. 2), such that a superimposition of the two gradients would lead substantially to a straight line and thus to a constant transmission function between the primary colors and the sensor signals generated thereby.

It was found in this connection that any short interferences in the sensor signal, which arise from the switching of the amplification factors at the transitions between the steps and which may cause a (slight) residual modulation of the sensor signal and thus of the lamp current and lamp power, do not have a visible effect because they are substantially of a high-frequency nature and are accordingly suppressed by the HES filter 33.

In the first color rendering method (field sequential color), finally, a (loss-free) fine tuning of the color temperature and an optimization of the represented color space are possible in that the individual sensitivities of the sensor or sensors to the primary colors are not mutually equalized, as in a constant transmission function, but are adjusted relatively to one another in a purpose-oriented manner.

This may be achieved through a suitable switching of the amplification factor in accordance with the modified second or third embodiment as explained above. A further possibility is to vary the transmittance values of the transmission filters 311, 321, 331 in the fifth embodiment of FIG. 13 or the amplification factors of the amplifiers 312, 322, 332 in the sixth embodiment of FIG. 14 such that a corresponding, non-linear gradient of said transmission function is obtained, and accordingly the desired color temperature of the represented image is achieved.

More in detail, a desired spectrum is substituted in the second equation given above instead of the actual power spectrum $I(\lambda)$ of the lamp light, and the transmittance values $F(\lambda)$ of the transmission filters (or the amplification factors, as applicable) for this are determined.

For example, if the desired spectrum is to contain a higher red content, the transmittance of the transmission filter lying behind the red color filter is reduced (FIG. 13), or the sensor signal is amplified a little less strongly during the radiation of the red primary color. The lamp driver circuit thus increases the lamp power via the current control during the representation of the red primary color to a corresponding degree, such that the color temperature of the image is shifted towards the red region.

An alternative to switching of the amplification factors is to subtract suitable constant voltage values in the respective steps of the sensor output signal for obtaining the desired gradient of said transmission function.

It should finally be noted that the principle of the invention can also be used if not three, but a different number of primary colors is generated and displayed.

The invention claimed is:

1. A projection system comprising:
   at least one lamp;
   at least one sensor for generating a sensor signal for monitoring changes in luminous flux generated by said at least one lamp and for compensating the changes with a comb filter for eliminating substantially periodic interference components from the sensor signal generated by the at least one sensor, wherein filter characteristic of the comb filter is controllable by means of a signal synchronous with a control signal of a color modulator which causes the interference components.

2. The projection system as claimed in claim 1, wherein said comb filter is configured to filter the sensor signal and to substantially suppress frequency components of the sensor signal generated by the interference components.

3. The projection system as claimed in claim 1, further comprising an amplifier for the sensor signal whose amplification is switchable in accordance with frequency of the interference components so as to achieve an at least substantial suppression of the interference components.

4. The projection system as claimed in claim 1, further comprising a unit for generating a sliding average of the sensor signal synchronized with the interference components, and a subtractor for subtracting the sliding average from the sensor signal.

5. The projection system as claimed in claim 4, further comprising a micro controller with a digital signal processing which comprises an analog/digital converter for digitizing the sensor signal, and a digital/analog converter (D/A) for converting digital average value of the sensor signal generated with said unit into an analog sensor signal.

6. The projection system as claimed in claim 5, wherein the micro controller comprises the subtractor in a digital embodiment, wherein one input of the subtractor is connected with an output of the unit and another input of the subtractor is connected with an output of the analog/digital converter, and wherein an output of the subtractor is connected with an input of the digital/analog converter.

7. The projection system as claimed in claim 6, in which the micro controller instead of the digital/analog converter (D/A) comprises a transmitting unit for generating a modulated sensor output signal for transmitting the modulated sensor output signal to a lamp driver unit.

8. The projection system as claimed in claim 5, wherein the micro controller is configured to generate a synchronicity signal based on an analysis of the sensor signal which is fed to the micro controller, with respect to periodically repeating wave forms, wherein the synchronicity signal is used for slidingly averaging the sensor signal.

9. The projection system as claimed in claim 1, wherein the color modulator is configured for a time-sequential generation of primary colors, and further comprising a filter arrangement for splitting up a light portion guided in the projection system into the primary colors, and an arrangement for compensating different sensitivities of the at least one sensor to the primary colors through amplification and/or damping of a relevant primary colors.

10. The projection system as claimed in claim 9, wherein said arrangement for compensating comprises at least a transmission filter having a determined transmittance.

11. The projection system as claimed in claim 9, further comprising a further sensor and an amplifier for each primary color, and wherein amplification of at least one of the amplifiers is adjustable for compensating for different sensitivities of the further sensors to the primary colors, and a mixer for mixing output signals of the amplifiers.

12. The projection system as claimed in claim 1, further comprising a lamp driver unit having at least one of the sensor and/or the comb filter, wherein at least one optical fiber is provided for connecting the at least one sensor optically with a light path of the light generated by the lamp.

13. The projection system as claimed in claim 1, wherein control of an image representation can be achieved through a control of brightness of the image representation.

14. The projection system as claimed in claim 13, wherein the brightness of the image representation can be controlled through a change in the lamp current.

15. The projection system as claimed in claim 13, wherein the brightness of the image representation can be controlled by an electrically controllable filter, and/or by a gray level mask added to the image representation, and/or by a modification of switching periods of a display.

16. A projection system comprising:
   at least one lamp;
   at least one sensor for generating a sensor signal for monitoring changes in luminous flux generated by said at least one lamp and for compensating the changes with a device for eliminating substantially periodic interference components from the sensor signal generated by the at least one sensor; and
   a time-sequential color rendering, wherein the periodic interference components are generated by primary colors generated by a color modulator, and wherein the primary colors can be adjusted by means of the device for eliminating the interference components such that a color temperature of an image projected by the projection system is adjustable.

17. A projection system comprising:
   at least one lamp;
   at least one sensor for generating a sensor signal for monitoring changes in luminous flux generated by said at least one lamp and for compensating the changes; and
   a filter for substantially eliminating from the sensor signal interference components caused by a device; wherein filter characteristic of the filter is controllable by a signal synchronous with the device that causes the interference components.

18. The projection system of claim 17, wherein the filter is a comb filter.

19. A projection system comprising:
   at least one lamp;
   at least one sensor for generating a sensor signal for monitoring changes in luminous flux generated by said at least one lamp and for compensating the changes; and
   a rendering unit configured to provide time-sequential color rendering, wherein interference components are generated by primary colors generated by a device, and wherein the primary colors are adjustable by the device for eliminating the interference components such that a color temperature of an image projected by the projection system is adjustable.

* * * * *